Nov. 7, 1967  S. ANDRASSY  3,351,538
SOLAR DISTILLATION EQUIPMENT
Filed June 18, 1963  2 Sheets-Sheet 1
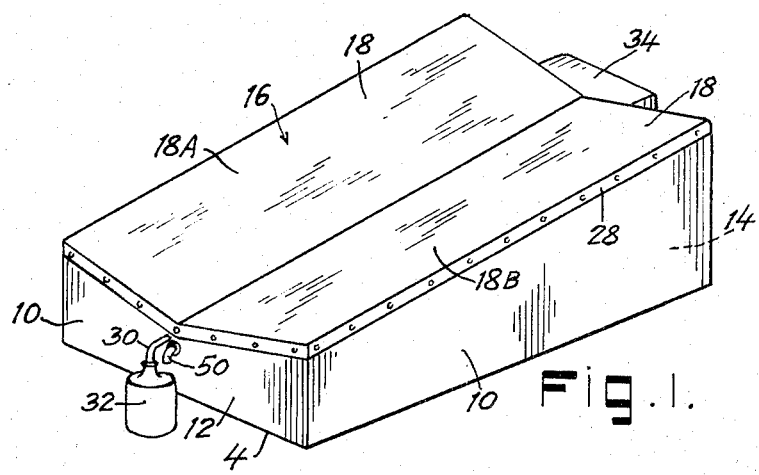
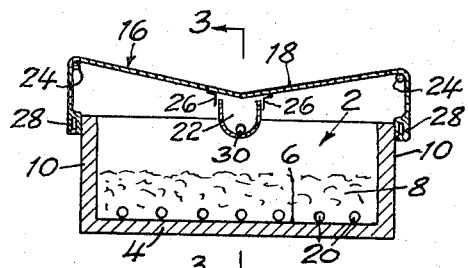
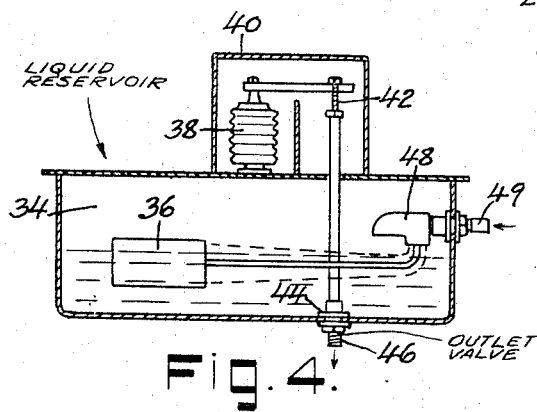
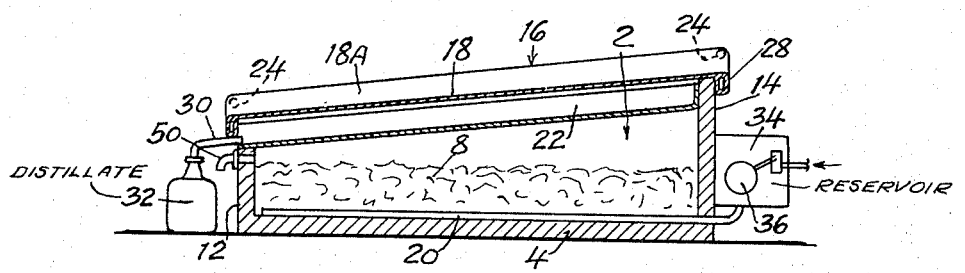
INVENTOR.
STELLA ANDRASSY
BY Albert Sperry
ATTORNEY

United States Patent Office 3,351,538
Patented Nov. 7, 1967

3,351,538
SOLAR DISTILLATION EQUIPMENT
Stella Andrassy, Ridge Road, Kingston, N.J. 08528
Filed June 18, 1963, Ser. No. 288,714
8 Claims. (Cl. 202—234)

This invention relates to methods and means for utilizing solar radiation for the purpose of evaporating liquids.

Many different types of solar stills have been designed and tested heretofore primarily for the purpose of obtaining fresh water from salt water. For this purpose, it is usual to provide the solar still with a black porous fabric to which the salt water is supplied by drainage from an upper supply chamber or by wicking from a lower salt water source.

The fabric thus supplied with the liquid to be distilled generally is exposed to solar radiation through a transparent cover or enclosure whereby the pure water distilled off from the salt water or liquid is caused to collect and deposit on the inner surface of the transparent enclosure. The distilled water thus obtained is caused to run down the inner surface of the transparent enclosure so that it can be collected and used for drinking purposes or for irrigation or any other use desired.

While such constructions operate successfully, it is found in practice that the yield of the distilled water obtained per square foot of exposed area of the still is relatively limited. Furthermore, the black fabric or felt ordinarily used as the wicking material to receive and hold salt water during the distillation process tends to collect mold or fungi which weaken the fabric with the result that the felt or wicking has to be replaced from time to time.

It has now been discovered that various types of dark porous absorbent materials and, in particular, granular materials can be employed in solar stills and can be utilized in much greater thickness than would be possible when employing the conventional fabric, felt or other wicking means heretofore used. Moreover, it has been discovered that most dark, porous and absorbent materials do not support the growth of deleterious bacteria and fungi with the result that they can be used for long periods of time and in thickness or bulk greatly exceeding that which can be employed when using the usual fabrics, felts, and wicking materials of the prior art. As a result, the amount of liquid presented for distillation and the yield of fresh water obtained from equipment of any given size and in any given time can be greatly increased, whereas, the frequency and difficulties presented in purging the equipment of excess salt or other material is reduced.

It is, therefore, an object of the present invention to provide new and improved types of solar distillation equipment. Another object of the invention is to provide a novel type of absorbent materials for use in solar distillation equipment. A further object of the present invention is to provide novel transparent means adapted to be placed over the material from which a liquid is to be evaporated whereby the transparent member can be used for various purposes as, for example, in producing fresh water from salt water or in drying fruits, vegetables, and the like to produce dried raisins, currents, prunes, apples, peaches, apricots and the like.

It is a further object of the invention to provide portable equipment for use in effecting the evaporation of fresh water from salt water, or for drying articles or products containing excess moisture.

These and other objects and features of the present invention will appear from the following description thereof wherein reference is made to the figures of the accompanying drawings.

In the drawings:

FIG. 1 is a perspective view of a typical embodiment of the present invention;

FIG. 2 is a transverse sectional view of a construction shown in FIG. 1;

FIG. 3 is a longitudinal sectional view of a construction shown in FIGS. 1 and 2 taken on the line 3—3 of FIG. 2;

FIG. 4 is a sectional view of a typical form of control means which may be employed in accordance with the present invention;

Figure 5:
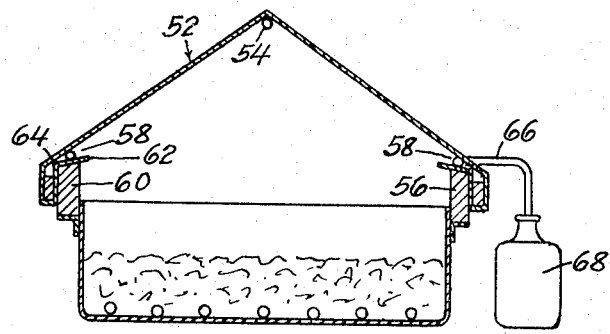
FIGS. 5, 6 and 7 are sectional views of alternative embodiments of the present invention.

In that form of the invention chosen for purposes of illustration in FIGS. 1 and 2 of the drawings, the solar distillation apparatus is provided with a transparent film or sheet of material through which the rays of the sun may penetrate. In a typical employment of the present invention, the transparent material employed is glass or a plastic material such as the polyvinyl flouride compositions sold under the trade names "Tedlar" and "Mylar." However, other transparent materials may be employed.

In that form of the invention chosen for purposes of illustration in FIGS. 1, 2 and 3, the equipment is provided with an evaporation chamber 2 having a base 4 with a downwardly facing surface which may rest upon the ground or any other surface and is provided with an upwardly facing water impervious surface 6 upon which granular material 8 is supported. The chamber 2 is provided with side walls 10 which project upwardly from the base 4 at opposite sides thereof and with end walls 12 and 14 extending upwardly from the base at opposite ends of the base. A cover member 16 composed primarily of transparent material 18 extends across the equipment between the side and end walls and is spaced from the granular material 8. The liquid to be distilled is supplied to the granular material by suitable means such as perforated liquid supply pipes 20 extending lengthwise of the equipment in parallel relation adjacent the upper surface 6 of the base and beneath the upper surface of the granular material 8.

The sides 10 and end walls 12 and 14 of the equipment may be made of any suitable material such as concrete, wood, metal, fiber glass, plastic, or the like, but is preferably made of material having relatively low heat conductivity or insulated to limit the transmission of heat therethrough whereby heat losses through the base will be minimized. The base 4 of the chamber 2 also may be formed of material having low heat conductivity if desired although the granular material 8 is generally used in such thickness as to reduce the transfer of heat from the interior to the exterior of the chamber through the base.

The chamber 2 may, of course, be of any desired size depending upon the quantity of liquid to be distilled and the yield of fresh water desired. Its size also will depend upon whether the equipment is designed to be portable or is a permanent installation.

The granular material 8 which is supported on the surface 6 of the base may vary in size from about one inch to about 1/32 of an inch or finer and is preferably of a relatively porous nature presenting extended surface area for the absorption and distribution of the liquid to be distilled. Typical of such materials are organic materials such as peat moss, charcoal, balsa or other wood particles in the form of wood chips, shavings, sawdust, or the like. In the alternative, the particles may be formed of porous inorganic material such as brick lava, pumice, silica gel, sandstone, porous limestone, or the like. If desired, mixtures of such materials may be employed. The granular material is preferably black or dark in color and, if desired, it may be dyed or otherwise treated to render it dark in color so as to increase its heat absorbing and/or its water absorbing properties.

The depth of the layer of granular material can be varied considerably depending upon the intensity of the solar radiation, the position of the surface of the granular material with respect to the sun, the nature of the liquid supplied to the equipment, the type of granular material employed, the form and construction of the equipment, and similar factors. For most purposes, peat moss is preferred and the depth of the layer of granular material should be not less than about one inch or more than about 8 inches. The preferred depth of the granular material when employing peat moss is from about 3 to 6, particularly when the equipment is used to obtain fresh water from sea water.

The transparent material 18 which extends over the granular material may be formed of plastic, glass or any other suitable material through which solar radiation may be readily transmitted to the granular material. The transparent material is inclined so as to cause liquid condensing on the inner surface thereof to flow downward on the inner surface to a liquid receiving channel 22. As shown in FIGS. 1 and 2, the transparent material 18 is supported in an elevated position at its opposite sides by means of rods or other supporting members 24. The central portion of the cover 16 is held at a lower elevation by suitable means or by the weight of the trough-like liquid receiving channel 22. The channel 22 may then be attached to the transparent material 18 by tapes 26 or by any other suitable means. The surfaces 18A and 18B of the transparent material, therefore, will be inclined transversely of the chamber 2 and toward the center of the chamber. The opposite sides and the ends of the transparent material extend downward about the outer edges of a frame 28 which fits closely around the sides and ends of the chamber. The edges of the transparent material may be secured to the frame 28 by nails, staples, cement or any other suitable material. The liquid receiving channel 22 is preferably inclined lengthwise of the equipment to aid in directing the distillate to one end thereof, and a discharge tube 30 communicates with the channel 22 for directing the fresh water or distillate to a vessel 32 or to other means for receiving or using the distillate produced.

In a preferred form of the invention, the transparent cover material 18 is formed of a plastic composition such as a polyvinyl resin sheet material and the inner surface of the sheet on which the water or distillate is to condense is pretreated to render the surface thereof slightly rough, irregular or "wettable." Thus, it has been found that when the surface of a plastic vinyl resin sheet is rubbed with an abrasive material, such as fine sand paper, emery cloth, steel wool, a fine grained grinding wheel, or the like while the surface of the sheet is wet, any liquid condensing on the roughened surface of the sheet tends to spread out into a thin film or to flow evenly over the surface of the sheet instead of accumulating in the form of droplets thereon. As a result, such a transparent sheet retains its uniform clarity during use, and water or other liquid condensing thereon is discharged readily therefrom to the receivers. The usual fogging or accumulation of droplets on the inner surface of the transparent sheet material is thereby reduced, and diffusion of the solar radiation or absorption or diminution thereof in passing through the transparent material is effectively reduced. Moreover, the tendency for the water which condenses on the inner surface of the transparent material to remain on the sheet and undergo re-evaporation is materially reduced and the capacity or efficiency of the equipment is materially increased.

In practice, it has been found that very effective wettability can be imparted to the inner surface of vinyl plastic sheet material by placing such material on a soft surface, wetting the surface with water, and rubbing the surface with fine sand paper using a circular motion. The desired degree of roughness which will assure effective wettability of the sheet will then become apparent when the water on the surface of the sheet spreads out into a continuous film and no longer accumulates in droplets on the abraded surface. However, if preferred, the surface of the transparent material may be roughened or abraded in other ways, and either resinous, glass or other transparent material employed may be suitably treated with an agent such as ammonia or a mild alkali or other material which serves to cause liquids to spread out when they contact the surface. However, most surface-treating agents thus employed tend to loose their effectiveness in a limited time due to the dissolving or washing away thereof or for other reasons.

In using equipment of the character described, the granular material within the chamber is first thoroughly wetted with sea water, or other liquid to be distilled, prior to initiating operation of the equipment. For this purpose, the transparent cover member 16 may be removed and the granular material 8 sprayed with the liquid until it is substantially saturated. Liquid may also be supplied to the granular material adjacent the base 2 of the equipment through the liquid supply pipes 20. The cover member is then replaced so as to fit closely about the sides 10 and end walls 12 and 14 in order to enclose and house the wetted granular material preventing the circulation of air through the chamber during the distillation operation. Additional water is supplied to the granular material from a reservoir 34 or other source connected to the pipes 20 to maintain the granular material wet or moist as the operation continues.

The equipment is positioned either horizontally or suitably inclined to allow sunlight and solar radiation to pass through the transparent material 18 to be absorbed by the granular material 8. In this way, the temperature of the granular material and the sea water or other liquid in contact with the granular material is raised sufficiently to cause fresh water to be distilled therefrom in the form of water vapor. The water vapor evaporating from the bed of granular material then condenses on the inner surface of the sheet of transparent material. The film or droplets of condensed water then run down the inner surfaces of the slanting sides 18A and 18B of the cover to the centrally located liquid receiving channel 22, and the fresh water thus collected is discharged from the equipment through the discharge tubes 30 to the vessel 32 or other means for collecting or using the fresh water.

As the operation continues, additional salt water or other liquid to be distilled is supplied to the granular material 8 from the reservoir 34 or from any other desired source and is supplied to the perforated pipes 20. This supply is preferably controlled so as to prevent flooding of the granular material while assuring the continual wetting or moistening thereof. Thus, a float ball 36 or the like may be provided in the reservoir 34 and the reservoir may be positioned to maintain the desired flow or level liquid in the lower portion of the granular material.

In the alternative, the supply of liquid to the granular material may be controlled by other suitable means such as that shown in FIG. 4. In this construction, an automatic liquid feed regulator is provided in the form of gas or liquid-containing bellows 38 exposed to the sun through a transparent enclosure 40. An actuating rod 42 connected to the bellows 38 is movable thereby to actuate a salt water outlet valve 44 controlling the flow of sea water from reservoir 34 to a supply pipe 46 leading to the perforated supply pipes 20 adjacent the base 4 of the evaporation chamber. The level of the salt water in the reservoir 34 is maintained constant by means of the float ball 36 controlling salt water inlet valve 48 connected to the inlet pipe 49. With this construction, when the solar radiation increases, the gas or liquid within the bellows 38 will expand to move the actuating rod 42 downward and open outlet valve 44 to feed a controlled amount of sea water to the perforated supply pipes 20. The level of the sea water within reservoir 34 is thus lowered and float ball 36 connected to inlet valve 48 will open to renew the supply of salt water maintained in reservoir 34. On the other hand, on cloudy days or at night time, when the temperature falls, the gas or liquid within the bellows 38 will tend to contract so as to close or reduce the opening of the outlet valve 44 and reducing the supply of salt water to the perforated pipes 20. In this way, undesired flooding of the granular material 8 with sea water will be prevented. Nevertheless, the elements may be adjusted to assure an adequate supply thereof to the granular material to prevent it from drying out during the more prolonged period in which the granular material and sea water in the evaporation chamber are losing their heat.

The bellows 38 may, of course, serve to control a valve connected directly to the liquid supply pipes 20 if desired, and other suitable or preferred means may be used in order to assure the continued moistening of the granular material within the chamber 2. However, for most effective operation, the supply of liquid to the granular material should be such that the lowermost layers of the granular material are substantially saturated with sea water, whereas, the uppermost layers are only slightly moistened and present extended surfaces and a multitude of openings or voids into which moisture vapor can pass freely and from which it can escape readily into the upper portion of the chamber for condensation on the surfaces of the transparent material.

The evaporation of water vapor from the sea water or other liquid being distilled will, of course, result in the accumulation of salt on and between the granules of porous material. It is, therefore, necessary to purge the granular material from time to time to remove the excess salt therefrom. This may be readily accomplished without materially disturbing the equipment by simply increasing the flow of salt water through the supply pipes 20. The sea water, while containing substantial amounts of salt, is not saturated and will instead take up additional salt from the salt-encrusted granules in the bed 8. The saturated, or more nearly saturated, salt water can then be discharged from the chamber through an outlet pipe 50 which passes through the end wall 12 of the chamber 2 near the upper surface of the base 4. If desired, of course, fresh water can be used to purge the granular material and remove the salt therefrom, and the equipment may be arranged to permit rocking or other agitation thereof to promote the dissolving of excess salt from the granular material. It may, nevertheless, be desirable in some instances to remove the cover from the chamber and to stir or mix the granular material about in the salt or fresh water being used to remove the excess salt from the granular material. Thereafter, the purging liquid can be drained off through the outlet pipe 50 and the outlet closed to prevent drying out or excessive drainage of salt water from the granular material.

When the granular material used is peat moss, charcoal, balsa wood particles or porous inorganic material, the purging of excess salt therefrom is accomplished very readily, whereas, little or no mold or fungi develop thereon. Moreover, it is not necessary to maintain the structural integrity required when using fabrics, felt, or other sheet material as the absorbent material of a solar still. Furthermore, the cost of the granular material is low, and the depth or thickness thereof can be maintained much greater, and the capacity of the equipment increased over that heretofore possible in solar distillation equipment.

It will be apparent that the shape of the transparent material upon which the liquid condenses can be varied considerably. Thus, as shown in FIG. 5, the central portion of the transparent member 52 may be elevated by a support 54 so that the opposite sides thereof will be inclined downwardly and outwardly from the center to the side walls 56 of the chamber to cause fresh water or liquid condensing on the inner surface thereof to liquid receiving channels 58 adjacent the sides of the chamber. In this construction, the frame 60 to which the edges of the transparent material is secured may be provided with upper outwardly inclined surfaces covered with plastic material 62 which is sealed to the transparent material 52 along the lines 64 to form the liquid receiving channels 58. Discharge tubes 66 communicate with the channels 58 to conduct the distillate to vessels 68.

If desired, constructions of the type shown in FIGS. 2 and 5 can be combined to provide an M-shaped cover or a series of similar parallel inclined condensing surfaces can be combined to cover an area covering an acre or more as required for any installation. Further, in the alternative, the transparent cover employed may be curved, dome-shaped, conical, pyramid-shaped, or otherwise formed as desired, and, in any case, may be supported by suitable framework which may be formed for disassembly or as a permanent construction. However, it is desirable in general to limit the size of any single chamber to avoid the development of objectionable convection currents therein which may tend to cause the granular material in one portion of the chamber to dry out while another is so wet as to reduce evaporation and permit reevaporation of the condensed liquid to take place. In practice, it is recommended that the chambers be no larger in size than about fifteen or twenty feet in any dimension.

Figure 6:
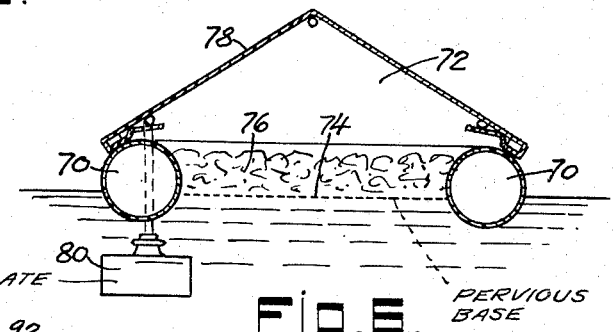

While for most purposes when using the present invention for the production of fresh water, the equipment may be installed in a permanent location, nevertheless, the invention is also adapted for use as a portable or floating construction as an emergency device on the ocean or salt lakes, for example. Thus, as shown in FIG. 6, the side and end members 70 of the chamber 72 may be hollow and inflated to allow the equipment to float on the surface of the liquid to be distilled, whereas, the botton 74 of the chamber may be formed of porous screen, fabric, or other liquid-permeable material. The granular material 76 will then be supported by the screen 74 in a position such that the screen and the lowermost portion of the granular material will contact the liquid on which the equipment floats. The cover 78 and the remaining elements of the equipment may then be constructed as previously described and the fresh water obtained can be collected in a container 80 for use.

The present invention is by no means limited to its use in obtaining fresh water from salt water, since it is also adapted for use in drying, dehydrating or removing liquid or moisture from fruits, vegetables, fodder, fish, naturally occuring asphalt, and wet coal, salts or mineral materials, and substantially any other substance containing volatile liquid which it is desired to remove from a material.

Figure 7:
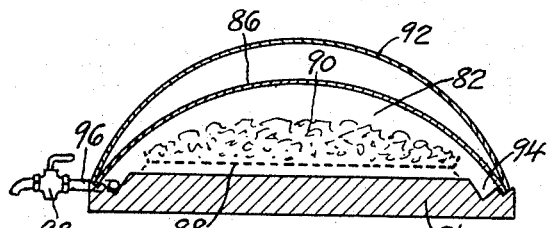

Accordingly, equipment of the type illustrated in FIG. 7 may be employed for drying grapes to produce raisins or for producing dried currants, prunes, apricots, apples, or the like, or for drying fish or products such as coffee beans, peas, lima beans, con, or other seeds and similar vegetable products.

As shown in FIG. 7, the chamber 82 has a base or supporting surface 84 which may either be impervious and of a heat-insulating character, or can, in fact, be the ground, platform or any other surface upon which the transparent cover 86 can be supported. In order to avoid contamination of the material with dust, dirt or particles from the ground or previously dried products, a perforated screen or rack 88 may be provided which is spaced a short distance from the base or supporting surface 82. Such a rack not only serves to allow dirt or particles to separate from the articles 90 being dried so as to fall through to the supporting surface, but also permits moisture to evaporate from the lower surface of the articles being dried. However, if desired, the screen or rack 88 may be omitted and the articles 90 can be placed directly upon the base or supporting surface 84.

In some instances, it is desirable to blanch vegetables, fish or other products prior to drying the same since the products then are not only improved in color but are found to have a better flavor and do not have the hard outer crust which so often forms in drying edible products. In order to blanch the product before drying the same, a black cover 92 may be placed over the vegetables, fish or the like as shown in FIG. 7. The heat absorbed by the cover than raises the temperature of the air adjacent the products so that they may be subjected to an initial relatively high temperature. The cover serves to retain moisture in contact with the product when it is thus heated and, if desired, additional moisture may be placed in the marginal liquid receiving channel 94 adjacent the edges of the base 84 to promote the blanching operation. The drainage outlet 96 will then be closed by a valve 98 or the like to assure the preservation of a hot moist atmosphere in contact with the articles being blanched. Further, if desired, an added blanching or bleaching agent may be placed in the liquid receiving channel 94. For this purpose, vinegar, sulphurous acid or the like may be used.

After the products have been suitably blanched, the cover 92 is removed and the valve 98 opened to drain off the liquid in channel 94. Thereafter, the product may be dried by solar heating and the condensate collecting on the inner surface of the transparent cover 86 will run down into the liquid receiving channel 94 and be discharged through the drainage outlet 96.

Products thus blanched and dried have an improved color, flavor and texture whereas oxidation and rancidity are reduced. At the same time, the enzyme development is retarded so that decomposition is prevented and the product may be preserved for long periods of time without deterioration.

Figure 8:
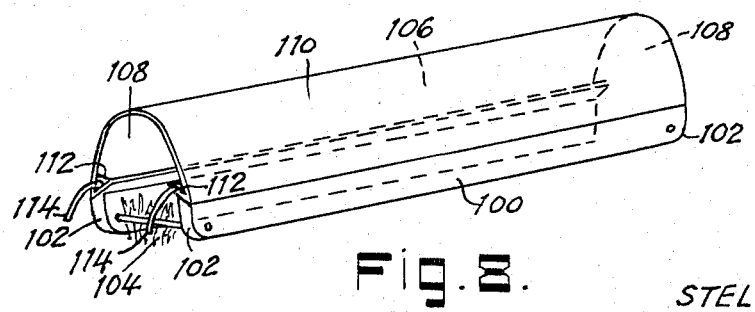
FIG. 8 is a perspective illustrating a further alternative form of the present invention.

In some instances, as shown in FIG. 8, the equipment may have no base, but instead has side walls 100 which rest upon the ground. In such constructions, the side walls may be in the form of skids or the like with upwardly turned ends 102 permitting the equipment to be moved over the ground from one position to another. Such constructions are particularly adapted for drying hay, fodder, or other material 104 which is heaped in windrows or rows. The chamber 106 may then be in the form an elongated tunnel-like construction with closure members 108 at the opposite ends thereof which are movable into closed positions to prevent the circulation of wind or air currents through the chamber while being movable to raised positions to allow the equipment to be moved lengthwise into operative position over a row of material to be dried.

The transparent cover member 110 of such equipment may present inclined sides or be rounded as shown with the opposite sides thereof located adjacent the side walls 100 of the chamber. Liquid-receiving channels 112 are formed adjacent the opposite lower edges of the transparent cover member 110 and are inclined toward one end of the chamber to direct liquid distilling off from the material being dried and condensing on the transparent member to discharge openings 114. The liquid thus removed from the material 104 may be collected in a suitable retainer or can be discharged onto the ground as desired.

In using the present invention to dry fruits, vegetables, crops, or the like, the relatively limited temperatures to which the materials are subjected serves to preserve the flavor and nutriment properties of the products with the result that the quality of the dried products is improved. Thus, for example, raisins which have been produced in accordance with the present invention are characterized by their superior flavor. Moreover, the products are protected from dust, flies, mold and the like, whereby they are substantially cleaner and more sanitary and may be preserved for longer periods of time without deterioration than products dried in the open air. The quality of coffee beans dried in accordance with the present invention is also improved.

It will, thus, be apparent that the present invention is capable of a great number of uses and applications, and the equipment employed may differ greatly in size, shape and construction. In view thereof, it should be understood that the particular embodiments of the invention shown in the drawings and described above are intended to be illustrative only and are not intended to limit the scope of the invention.

What is claimed is:

1. Solar distillation equipment comprising a chamber having a peripheral wall, an inclined transparent cover for said chamber, a base for said chamber secured to the wall having dark granular material supported on the base in the form of a layer of predetermined depth located beneath said transparent cover, means for supplying liquid to be distilled to the granular material on said base, said means being operable to maintain said liquid at a level in said chamber above the base thereof but not normally exceeding the depth of said layer of granular material so as to maintain at least the lower portion of said layer substantially saturated with said liquid, and means located adjacent the lower portion of said inclined transparent cover in position to receive condensate flowing down the inner surface of said cover.

2. Solar distillation equipment as defined in claim 1 wherein said granular material is porous.

3. Solar distillation equipment as defined in claim 1 wherein said granular material is substantially 1 to 8 inches in depth.

4. Solar distillation material as defined in claim 1 wherein said granular material is peat moss.

5. Solar distillation equipment as defined in claim 1 wherein said means for supplying liquid to said chamber includes an element responsive to the intensity of solar radiation controlling the supply of liquid to said granular material.

6. Solar distillation equipment as defined in claim 1 wherein said cover is formed of a plastic material having the inner surface thereof abraded in such a manner as to cause liquid condensing thereon to spread out and flow downward thereover in the form of a film.

7. Solar distillation equipment comprising a chamber having a peripheral wall, an inclined transparent cover for said chamber, said chamber having a base secured to said wall which is pervious to liquid, porous granular material supported on said base, buoyant means for supporting the equipment on the surface of liquid upon which it may be placed, said base being supported at a level and positioned to allow said porous material supported thereon to be wet by said liquid, and means located adjacent a lower portion of the inclined transparent cover in position to receive condensate flowing downward on the inner surface of said cover.

8. Solar distillation equipment as defined in claim 7 wherein said chamber has a base in the form of a screen for supporting the granular material.

(References on following page)

References Cited

UNITED STATES PATENTS

| | | | |
|---|---|---|---|
| 983,424 | 2/1911 | Brosius | 203—10 X |
| 1,812,516 | 6/1931 | Dooley | 202—234 |
| 2,342,201 | 2/1944 | Kain | 202—234 |
| 2,383,234 | 8/1945 | Barnes | 202—234 |
| 2,398,291 | 4/1946 | Delano | 202—234 |
| 2,413,101 | 12/1946 | Delano | 202—234 |
| 2,762,569 | 9/1956 | Caillol | 236—99 X |
| 2,807,912 | 10/1957 | Bjorksten | 47—58 |
| 2,893,878 | 7/1959 | Simon et al. | 99—207 |
| 2,973,276 | 2/1961 | Cyr | 99—207 |
| 3,159,554 | 12/1964 | Mount | 202—234 |
| 3,194,228 | 7/1965 | Bargues | 126—271 |

FOREIGN PATENTS

| | | |
|---|---|---|
| 236,337 | 11/1961 | Australia. |
| 974,650 | 11/1964 | Great Britain. |
| 6,077 | 5/1963 | Japan. |

OTHER REFERENCES

Dept. of Interior, Office of Saline Water Research and Development, available from Dept. of Commerce: Progress Report No. 50, 1961, pp. 51, 52 and 80; Progress Report No. 60, March 1962, pp. 65–69.

NORMAN YUDKOFF, *Primary Examiner.*

HYMAN LORD, *Examiner.*

J. SOFER, *Assistant Examiner.*